United States Patent
Wang

(10) Patent No.: US 10,588,081 B2
(45) Date of Patent: Mar. 10, 2020

(54) ASYMMETRIC PERTURBATION METHOD FOR A MOBILE TRANSMIT DIVERSITY COMMUNICATION DEVICE

(71) Applicant: Google LLC, Mountain View, CA (US)

(72) Inventor: Sherwin Wang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/040,829

(22) Filed: Jul. 20, 2018

(65) Prior Publication Data

US 2018/0352510 A1    Dec. 6, 2018

Related U.S. Application Data

(63) Continuation of application No. 14/127,829, filed as application No. PCT/US2012/045018 on Jun. 29, 2012, now abandoned.

(60) Provisional application No. 61/503,932, filed on Jul. 1, 2011.

(51) Int. Cl.
| | |
|---|---|
| *H04B 7/06* | (2006.01) |
| *H04B 7/04* | (2017.01) |
| *H04W 52/02* | (2009.01) |
| *H04B 7/0404* | (2017.01) |

(52) U.S. Cl.
CPC ...... *H04W 52/0212* (2013.01); *H04B 7/0617* (2013.01); *H04B 7/0623* (2013.01); *H04B 7/0682* (2013.01); *H04B 7/0404* (2013.01); *H04B 7/0671* (2013.01); *Y02D 70/00* (2018.01); *Y02D 70/444* (2018.01)

(58) Field of Classification Search
CPC ............ H04W 52/0212; H04B 7/0623; H04B 7/0617; H04B 7/0682; H04B 7/0404; H04B 7/0671; Y02D 70/00; Y02D 70/444
See application file for complete search history.

(56) References Cited

U.S. PATENT DOCUMENTS

| | | | |
|---|---|---|---|
| 2007/0218849 A1* | 9/2007 | Harel | ................... H03F 3/24 455/127.3 |
| 2008/0123775 A1* | 5/2008 | Abreu | ................... H04B 7/0617 375/299 |
| 2008/0139135 A1 | 6/2008 | Abreu et al. | |
| 2008/0151798 A1* | 6/2008 | Camp | ................... H04B 1/1615 370/311 |

(Continued)

FOREIGN PATENT DOCUMENTS

| | | |
|---|---|---|
| GB | 2353437 | 2/2001 |
| WO | WO 2008/057471 | 5/2008 |

OTHER PUBLICATIONS

International Search Report and Written Opinion, European Patent Office, Application No. PCT/US2012/045018, dated Aug. 17, 2012.

(Continued)

*Primary Examiner* — Dong-Chang Shiue
(74) *Attorney, Agent, or Firm* — Fish & Richardson P.C.

(57) ABSTRACT

A method and apparatus for selectively adjusting transmit diversity parameters in a mobile communication system including a mobile device and a base station. The mobile device transmits a signal set comprised of a plurality of signals differing only in phase from one another, receive in response an input parameter for each set, and adjust the phase difference of a subsequently transmitted signal set as a function of the input parameters.

20 Claims, 5 Drawing Sheets

(56) References Cited

U.S. PATENT DOCUMENTS

| | | | |
|---|---|---|---|
| 2008/0160922 A1* | 7/2008 | Sun | H04B 7/0632 455/67.14 |
| 2010/0215088 A1 | 8/2010 | Park et al. | |
| 2010/0266063 A1 | 10/2010 | Harel et al. | |
| 2011/0286347 A1* | 11/2011 | Mohanty | H04B 7/0689 370/252 |
| 2012/0009968 A1* | 1/2012 | Kludt | H04B 7/0689 455/522 |

OTHER PUBLICATIONS

Office Action issued in European Application No. 12735731.7, dated Feb. 7, 2018, 5 pages.

Ahmadi, "Power Headroom; Medium Access Control Functions," LTE-Advanced, 2014, 10 pages.

Lassp.cornell.edu [online], "What's Hysteresis?" available on or before Jul. 10, 1997, via Internet Archive: Wayback Machine URL <https://web.archive.org/web/*/http://www.lassp.cornell.edu/sethna/hysteresis/WhatIstlysteresis.himl>, retrieved on Oct. 15, 2019, URL<http://www.lassp.cornell.edu/sethna/hysteresis/WhatIsHysteresis.html>, 2 pages.

Lexico.com [Online], "Definition of hysteresis in English," Dec. 1998, retrieved on Oct. 15, 2019, retrieved from URL<https://www.lexico.com/en/definition/hysteresis>, 1 page.

Merriam-webster.com [online], "hysteresis," available on or before Nov. 3, 2006, via Internet Archive: Wayback Machine URL<https://web.archive.org/web/*/https://www.merriam-webster.com/dictionary/hysteresis>, retrieved on Oct. 15, 2019, URL<https://www.merriam-webster.com/dictionary/hysteresis>, 3 pages.

Sharetechnote.com [online], "LTE Quick Reference," available on or before Dec. 11, 2013 via Internet Archive: Wayback Machine URL<https://web.archive.org/web/*/https://www.sharetechnote.com/html/Handbook_LTE_PHR.html>, retrieved on Oct. 15, 2019, URL<https://www.sharetechnote.com/html/Handbook_LTE_PHR.html>, 2 pages.

Wikipedia.com [online], "Hysteresis," available on or before Jan. 18, 2004, via Internet Archive: Wayback Machine URL <https://web.archive.org/web/*/https://en.wikipedia.org/wiki/Hysteresis>, retrieved on Oct. 15, 2019, URL<https://en.wikipedia.org/wiki/Hysteresis>, 15 pages.

* cited by examiner

Symmetric Phase Perturbation

Asymmetric Phase Perturbation

Asymmetric Phase Perturbation with multiple (>2) phase perturbation

ASYMMETRIC PERTURBATION METHOD FOR A MOBILE TRANSMIT DIVERSITY COMMUNICATION DEVICE

CROSS-REFERENCE TO RELATED APPLICATIONS

This application is a continuation of U.S. application Ser. No. 14/127,829, filed Dec. 19, 2013, which claims priority to International Application No. PCT/US2012/045018, filed Jun. 29, 2012, which claims benefit of U.S. Provisional Patent Application Ser. No. 61/503,932, filed Jul. 1, 2011, the contents of each are incorporated by reference herein.

FIELD

This disclosure relates generally to the field of mobile wireless communications and more specifically to adjusting phase in a mobile transmit diversity communications device using asymmetric perturbation, wherein the phase is adjusted as a means to control the power level received at a base station.

BACKGROUND

A transmit diversity communication device is one having a plurality of transmit paths that simultaneously transmit respective transmit signals that differ by a transmit diversity signal, for example, a relative phase, relative amplitude, or relative power. One goal of mobile transmit diversity is to obtain constructive interference, also known as beamforming, of the transmit signals at the receiver, e.g., a base station.

In transmit diversity systems, one possible advantageous feature is an extension of operating range. This effect may be an outcome of forming a beam using the plurality of transmit paths that exhibits a higher Effective Radiated Power (ERP) at the base station than a conventional (non-diversity) transmitter transmitting using a single transmit path. Transmit beamforming can be performed by using feedback information from the receiver to the transmit diversity transmitter in adjusting the value of the transmit diversity parameter.

As described in prior patent applications of the assignee of the present disclosure, a mobile transmit diversity (MTD) device may use two antennas simultaneously transmitting with a transmit diversity parameter, for example, a phase difference or a power ratio between at least two antennas. In one implementation, two power amplifiers may be used to amplify the respective transmit signals, thereby potentially providing a current (i.e., power) saving by the mobile device. Use of mobile transmit diversity may permit extending the effective range of a mobile device from a base station using the same (or less) power as a non-diversity transmission device.

When configured to provide beam forming MTD, the relative phase between the two paths may be adjusted such that the signals arrive at the base station antenna in-phase to constructively add. In this case the performance is higher than achieved with just the sum of the two powers combined. The difference is diversity gain (Gd).

Because a mobile transmit diversity device may obtain a diversity gain at the receiver using feedback to provide beamforming, current consumption efficiency gains may be produced. For example, a suitable receive power may be Obtained by operating one or more of the amplifiers at less than half the specification power of the device. Accordingly, one or both of the amplifiers may be operated to provide maximum efficiency at a fraction, e.g., half or even a quarter of the specification power of the device.

SUMMARY OF THE PRESENT DISCLOSURE

The present implementations are directed to a transmit diversity approach, whereby the mobile device receives an input parameter from a base station in response to a transmitted plurality of signals, and the mobile devices uses a series of such input parameters to adjust a transmit delivery parameter.

In the following description, the transmit diversity parameter used for purposes of illustration is phase difference between two transmit paths. It will be understood that more than two transmit paths may be used within the scope of the disclosure. Likewise, different or additional transmit diversity parameters, e.g., power ratio, may be used. It will also be understood that transmit power control (TPC) signals are used as an illustration of a signal quality indicator, but that alternatively or additionally, other signal quality indicators may be used.

According to implementations of the disclosure, the mobile device may transmit data with a plurality of different phase differences, for example, progressively changing in a positive or negative direction from a reference phase, and make further decisions according to the respective plurality of TPC feedback signals received in response to the signals. For example, an initial phase difference may be $\varphi_0$. The mobile device may then transmit at least the next two transmit signals with phase difference changing in a single direction, e.g., phase differences $\varphi_1$ and $\varphi_2$, where $\varphi_0 < \varphi_1 < \varphi_2$ or $\varphi_0 > \varphi_1 > \varphi_2$. In response, the base station will transmit a commensurate number of TPC feedback signals, e.g., one for each of $\varphi_1$ and $\varphi_2$. It will be understood that in the present illustration, two phase differences are provided, but more than two phase differences, e.g., three, four, or five, phase differences may be used in sequence, and a commensurate number of feedback signals gathered.

According to implementations of the disclosure, when transmitting a signal, the device may transmit the same signal using phase differences. That is a signal may be transmitted as a signal set, with the signals in the signal set containing the same content, but differing in phase.

The receiver at the base station has the ability to recognize the received power, which may be consequential to a combination of signals, differing only in phase. This combination of signals may serve the function of beam forming. In response, the base station may return a parameter which can be interpreted by the device as indicating whether the received power level was too high or too low. For example, the returned parameter can be a single bit, where 1 indicates that the power level was higher than necessary and 0 indicates that the power level was lower than necessary.

The device can then store the parameters returned and can use the stored information to determine an adjustment in phase.

In the present implementation, the device can adjust phase based on the parameters in a number of ways. For example, the device can adjust phase based on the most recent returned parameter, the most recent returned quantity of parameters (such as 2, 3, 4, or 5), alternate received parameters, or weighting factors applied to the most recent parameters.

The above is a brief summary of a number of unique aspects, features, and advantages of the present disclosure. The above summary is provided to introduce the context and certain concepts relevant to the full description that follows.

However, this summary is not exhaustive. The above summary is not intended to be nor should it be read as an exclusive identification of aspects, features, or advantages of the claimed subject matter. Therefore, the above summary should not be read as imparting limitations to the claims nor in any other way determining the scope of said claims.

BRIEF DESCRIPTION OF THE DRAWINGS

The subject matter regarded as the disclosure is particularly pointed out and distinctly claimed in the concluding portion of the specification. The disclosure, however, both as to organization and method of operation, together with objects, features, and advantages thereof, may best be understood by reference to the following detailed description when read with the accompanying drawings in which:

DETAILED DESCRIPTION

Figure 1:
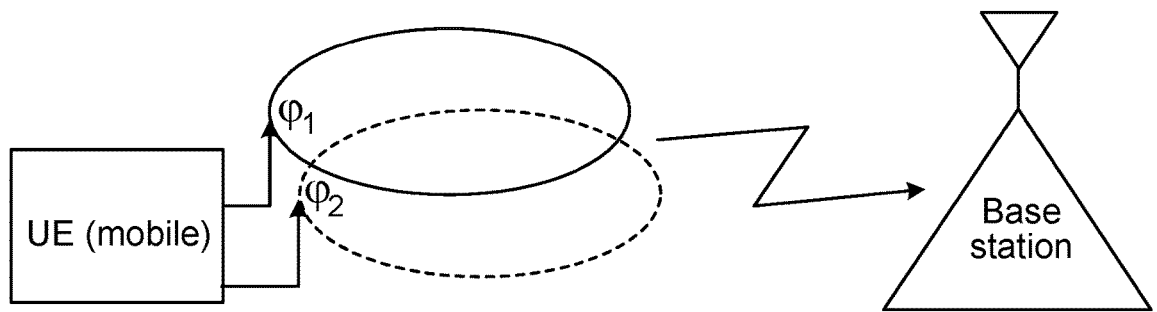
FIG. 1 is a schematic diagram of a system according to an implementation of the disclosure.

Implementations of the disclosure may be used in communication systems in connection with mobile transmit diversity devices. A communication system may include a mobile transmitter, also referred to as a modifying communication device, that adjusts a nominal value of a transmit diversity parameter, for example, a phase difference and/or a power ratio between a signal transmitted on a first antenna and a second antenna. Although the implementations described in the present application are described as using two antennas, it will be recognized that the present disclosure is equally applicable to transmit diversity systems and devices having more than two antennas.

In the following detailed description, numerous specific details are set forth in order to provide a thorough understanding of the disclosure. However, it will be understood by those skilled in the art that the present disclosure may be practiced without these specific details. In other instances, well-known methods, procedures, and components have not been described in detail so as not to obscure the present disclosure.

Although implementations of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method implementations described herein are not constrained to a particular order or sequence. Additionally, some of the described method implementations or elements thereof can occur or be performed simultaneously, at the same point in time, or concurrently.

The present disclosure may be applicable in any communication network between a mobile device and a second communication device, including but not limited to a base station. Networks may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Communication devices in a network may use any suitable multiple access technology, for example, a code division multiple access (CDMA) technology. According to one implementation, the network may operate according to a CDMA 2000 telecommunications technology that uses a single CDMA channel. As an example, a CDMA2000 high rate data packet technology, such as the Evolution Data Optimized (EVDO) technology may be used.

The network may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of a network, for example, a mobile communication device, may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

The communication network may include one or more mobile or modifying communication devices and one or more other communication devices, for example base stations that communicate via a wireless link. A mobile communication device unit may comprise any device operable to communicate with a base station, for example, a personal digital assistant (PDA), a cellular telephone, a mobile handset, a laptop computer, or any other device suitable for communicating signals to and from a base station. A subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

According to implementations of the disclosure, the mobile communication device may include two or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

As described more fully below, according to implementations of the present disclosure, the mobile communication device may include a processor and a transmit/receive module that calculate and produce one or more signals for transmission over a plurality of antennas.

According to one implementation, modifying a signal may refer to modifying a signal feature. For example, a signal may be transmitted by the two antennas using a modified signal feature, or a different value of a transmit diversity parameter. A transmission signal feature, or in some implementations of the disclosure, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between signals in the same signal set, such as the phase of a signal transmitted by a first transmit antenna and the phase of a signal transmitted by a second transmit antenna. Relative power may refer to the ratio between the power of a first signal of a first transmit antenna element and the power of a second signal of a second transmit antenna element, Which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device. According to one implementation, modifying a signal may be described as adjusting a nominal value of a transmit diversity parameter.

According to implementations of the disclosure, a diversity parameter may be a parameter distinguishing between the transmission on any two antennas, for example a difference in transmission phase on the two antennas, or a ratio of transmission power on the two antennas. It will be understood that although examples are provided in the present application pertaining to phase difference between two antennas, the disclosure is applicable using the same principles to varying any transmit diversity parameter.

Mobile user equipment devices (UEs) using beam forming transmit diversity (MTD) may typically use two transmit chains each including, but not limited to a phase modulator (PM), power amplifier (PA) and primary and secondary antennas.

In a typical operation, the base station may adjust the transmitted power of the UE with a TPC feedback command so as to limit the transmitted power to be no higher than necessary, or so as to increase the transmitted power to overcome fading.

Using TPC to Adjust Relative Phase

The transmit diversity parameter may be modified in order to provide beamforming at the base station. In one implementation of MTD, the UE may employ an algorithm using the TPC to adjust the relative phase between the transmitted signals and observe the effect on the power command received by the UE. The power command may be a "power up" or "power down" command, which respectively suggest the appropriateness of increasing or decreasing power levels. The phase adjusting algorithm may assume the phase setting that produces a "power down" command is at a more nearly optimum constructive phase than a phase setting that produces a "power up" command. This cause and effect process is constantly adjusting the relative phase to maintain the signals' relationship in spite of changing geometry of the UE with respect to the base station and through varying propagation conditions. In another implementation of MTD, the base station may expressly instruct the UE how to modify the phase difference so as to improve reception.

It will be understood that implementations of the disclosure may be used in connection with any type of transmit diversity feedback, including without limitation, "open-loop" feedback, which uses a feedback parameter not dedicated to transmit diversity such as a TPC signal for adjusting the transmit diversity parameter, or "closed-loop" feedback, which determines the present value of a transmit diversity parameter or its component parts, and uses a dedicated transmit diversity feedback, e.g., an explicit instruction from the base station to adjust the transmit diversity parameter.

When a mobile device accesses the wireless network at the cell edge, especially when uploading data at peak possible rate it is transmitting at high power; MTD may provide a battery power savings by virtue that diversity gain allows the use of lower transmitter power to provide the same Effective Isotropically Radiated Power (EIRP) than a non-diversity unit. Therefore at cell edge, where the propagation losses are high, or in high fading situations, the diversity gain may provide continued operation, even when a non-diversity UE would cease to maintain a connection as well as higher data rate and better quality than a single antenna UE. However, when only low transmitter power are required, for example, e.g. when the UE is close to the base station or when in mid range but at low data rate, reduced power amplifier efficiency at low power plus the additional operating current of the Phase Modulator (PM) or the additional RF channel required to route the baseband resident PM, may result in a decreased battery life than would be provided by a non-diversity UE in a similar situation. Implementations of the disclosure may allow MTD devices to employ power saving when doing so would be beneficial, but not to suffer excessive power consumption when doing so would be costly. According to some implementations of the disclosure, some excessive power consumption, within a predetermined limit, may be acceptable for a possible gain in network capacity.

FIG. 1 is a schematic diagram of a system according to an implementation of the disclosure. FIG. 1 depicts a mobile communication device (UE) having a plurality of antennas in wireless communication with a base station. Although two antennas are shown, it will be understood that principles of the disclosure are equally applicable to a UE with more than two antennas, which is also within the scope of the present disclosure.

In some implementations of the disclosure, the mobile device may include two or more transmit paths, or channels, each associated with a respective transmit antenna. Such a transmit path may include, for example, an RF power amplifier' and a transmit antenna. One or more of the transmit paths may include a diversity parameter adjustment module, e.g., a phase modulator if the transmit diversity parameter is a relative phase.

Also shown in FIG. 1 is an example of mobile transmit diversity on the uplink with beam forming. In the example shown, signals $\varphi_1$ and $\varphi_2$ are being transmitted. The example assumes a reference phase $\varphi_0$, with $\varphi_1$ and $\varphi_2$ each being offset from $\varphi_0$. In the example, both signals are transmitted toward the base station.

According to implementations of the disclosure, current loss may be avoided in low power conditions, when non-diversity operation is enabled (or diversity operation disabled). Disabling MTD may involve powering down, e.g., disconnecting from a power source or switching to standby mode, the phase modulator and/or half-power amplifier, or disabling the second. RF path that routes the baseband residing phase modulator. Current savings may refer to a decrease in the power drawn by the UE in total, particularly in relation to a real or hypothetical non-diversity transmitter operating in similar conditions.

Figure 2:
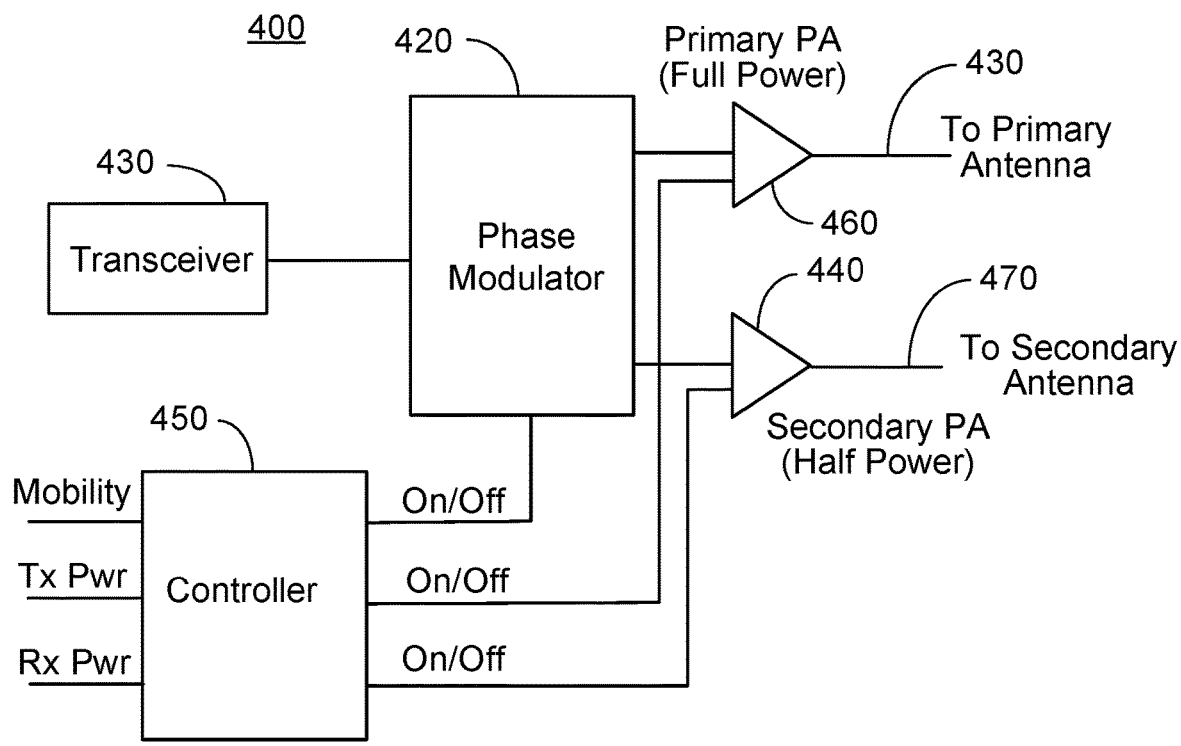
FIG. 2 is a schematic diagram of amplifier efficiency versus a range of output power of a full power and half power PAs in accordance with an implementation of the disclosure.

FIG. 2 is a schematic diagram of a device according to an implementation of the disclosure. As shown, the mobile communication device may include a transceiver (410) and at least two transmit paths. A primary transmit path (430) may be associated with a primary power amplifier (460), which may provide signal amplification to the full specification power of the device, and a secondary transmit path (470) associated with a secondary power amplifier (440), which may provide signal amplification to a fraction, e.g., half, of the specification power of the device. Each path may have a respective associated antenna. The device may include one or more diversity parameter modulators, e.g., a phase modulator (420), which may be associated with one or more transmit paths. It will be recognized that the phase modulator may comprise a plurality of phase modulators on each or both of the transmit paths. A controller (450) may be connected to receive inputs and produce outputs to control various operations of the transmit paths, as described herein. For example, the controller may provide an enabling/disabling signal to any or all of the phase modulator (420), the primary power amplifier (460), and the secondary power amplifier (440).

It will be recognized that although the implementation of FIG. 2 shows full- and half-power amplifiers, in other implementations of the disclosure, the amplifiers may both be fractional power, having different fractions of specification power, eg, half and quarter power, or similar fractional powers, e.g., both half of specification power, or may both be full-power amplifiers. For example, in some implementations of the disclosure, the power amplifiers on the respective transmit paths may have the same transmit power, e.g., each may be rated for a fraction (e.g., half or quarter) of the specification power limit of the device as a whole based on its class. It will be further understood that the optimal efficiency of an amplifier may be modified by altering its supply voltage. Thus, for example, a "full-power" power amplifier may be turned into a "half-power" power amplifier by halving its supply voltage, thereby shifting its point of optimal efficiency to half the power.

According to implementations of the disclosure, as described below, the mobile communication device may use both power amplifiers in transmit diversity as described above, and then, e.g., in response to a condition as described below, use only one of the power amplifiers, e.g., the primary amplifier, in non-diversity transmit mode. In such implementations, although diversity gain may be given up by transmitting over one transmit path or the other, one antenna may be a better choice due to power consumption considerations.

Although additional implementations of the disclosure described below refer to two amplifiers, e.g., a high power amplifier and a low power amplifier, or a full-power and half-power amplifier, it will be understood that the methods described are fully applicable to implementations having more than two power amplifiers.

In some implementations of the disclosure, the power amplifiers in the transmit paths may be rated for a different output power. For example, a first power amplifier in a first transmit path may be rated to transmit a high power and a second power amplifier in a second transmit path may be rated to produce a lower power. More specifically, as depicted an implementation of the disclosure shown in FIG. 2, the first power amplifier may be rated to transmit a full power allocated to the device unit of its class, e.g., +24 dBm, and be connected to the primary antenna, and the second power amplifier may be rated to transmit a fraction, eg, half, of the full power allocated to the device unit of its class, e.g., +21 dBm, and be connected to the secondary antenna.

It will be recognized that when employing transmit diversity, the base station may receive a signal power level approximately equal to effective received power Pe, where Pe=[Pt+Antennas gain+Gd−Power Loss in Path]. Pt may be the power Pout driving the mobile's antennas assembly, and Gd is the diversity gain provided by coherently transmitting more than one signal. If the mobile device is transmitting at the maximum power allowed by its class, the range from the base station with which it can operate satisfactorily may be extended past a non-diversity mobile device because of the diversity gain Gd. Less power may be used for transmission by a diversity mobile device than a non-diversity mobile device in order to maintain the same range, which may lead to a potential current consumption saving.

According to some implementations of the disclosure, the UE includes a transceiver as shown in FIG. 2, and may include providing the drive signal to a Phase Modulator (420). The Phase Modulator (420) may apply to the transmitted signals a phase shift between the primary and secondary transmit paths.

According to an implementation of the disclosure, the primary transmit path (430) may include a full-power power amplifier (PA) (460) and the secondary transmit path (470) may include a half-power PA (440).

According to some implementations of the disclosure, the UE transmitter may be switched between diversity and non-diversity operation. The switching action may at least in part be based on a condition associated with the level of transmitted power. Transmitted power may refer to any or all of the transmit power of one or both of the transmit paths, the power received by a station, or a substitute parameter such as received power, or the like.

In order to selectively activate or deactivate diversity transmission, the diversity controller may place the Phase Modulator and/or Full Power PA in active or standby mode, or shut it off, for example, by changing the value of an enable/disable/standby input pin, depending on whether diversity operation (active) or non-diversity operation (standby) are commanded. As described below, switching may be affected by additional parameters, e.g., capacity considerations such as refraining from switching during increased transmission activity, and/or mobility detection, e.g., anticipating a trend in transmit power based on motion of the UE towards or away from a base station.

Figure 3A:
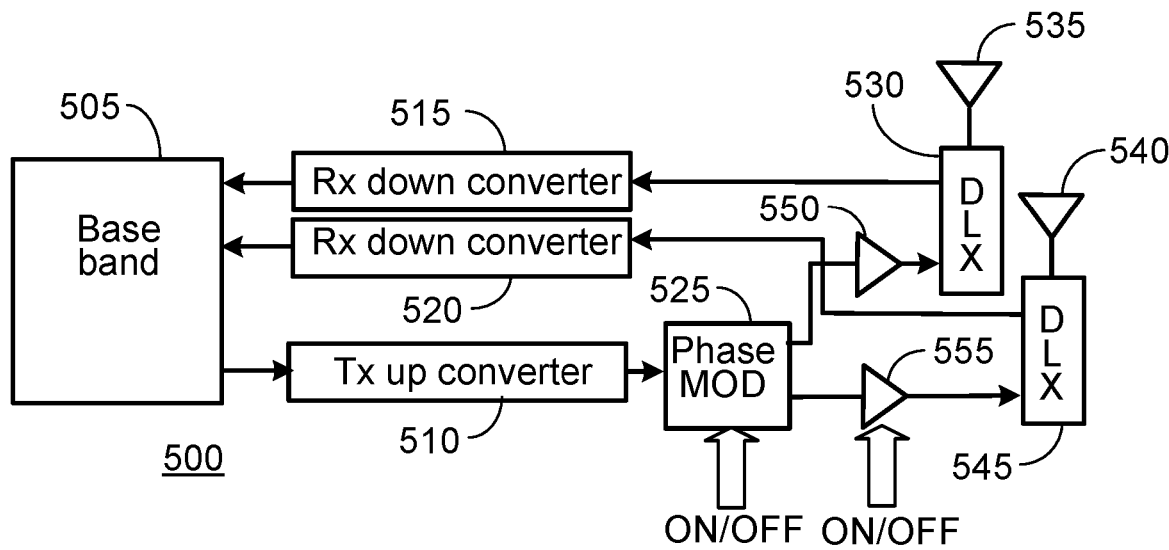
FIGS. 3A and 3B are schematic diagrams of devices according to implementations of the disclosure.

FIG. 3A is a schematic diagram of a device according to an implementation of the disclosure (500). As shown, the mobile communication device may include a baseband processor (505) and at least two transmit paths. Each of the transmit paths may include an RF transmit up converter, an RF receive down converter, an amplifier, a duplex module, and an antenna. A down converter may refer to a module that converts an input signal centered at a radio frequency, for example, as received by the antenna, or an intermediate frequency to a baseband signal centered at the zero frequency. An up converter may refer to a module that converts an input baseband signal centered at the zero or Intermediate frequency to an RF signal centered around the transmission frequency for transmission by the antenna. Accordingly, for example, a primary receive path may be associated on the receive side with a receive RF down converter (515), and on the transmit side with a transmit RF up converter (510), which may be shared with the secondary transmit path, and a high or full power amplifier (550), which may provide signal amplification to the full specification power of the device. The primary transmit and receive paths may share an antenna (535) using a duplex module (530). Likewise, a secondary transmit path may be associated on the transmit side with the shared transmit RF up converter (510) and a low or fractional power amplifier (555), which may provide signal amplification to a fraction of the full specification power of the device, and on the receive side with an RF receive down converter (520). The secondary transmit and receive paths may share an antenna (540) using a duplex module (545). The device may include one or more diversity parameter modulators, e.g., a phase modulator (525), which may be associated with one or more transmit paths. In the implementation shown, the phase modulator (525) may be a separate module that receives an up converted signal from the baseband processor and produces two transmit signals differing by a diversity parameter.

Figure 3B:
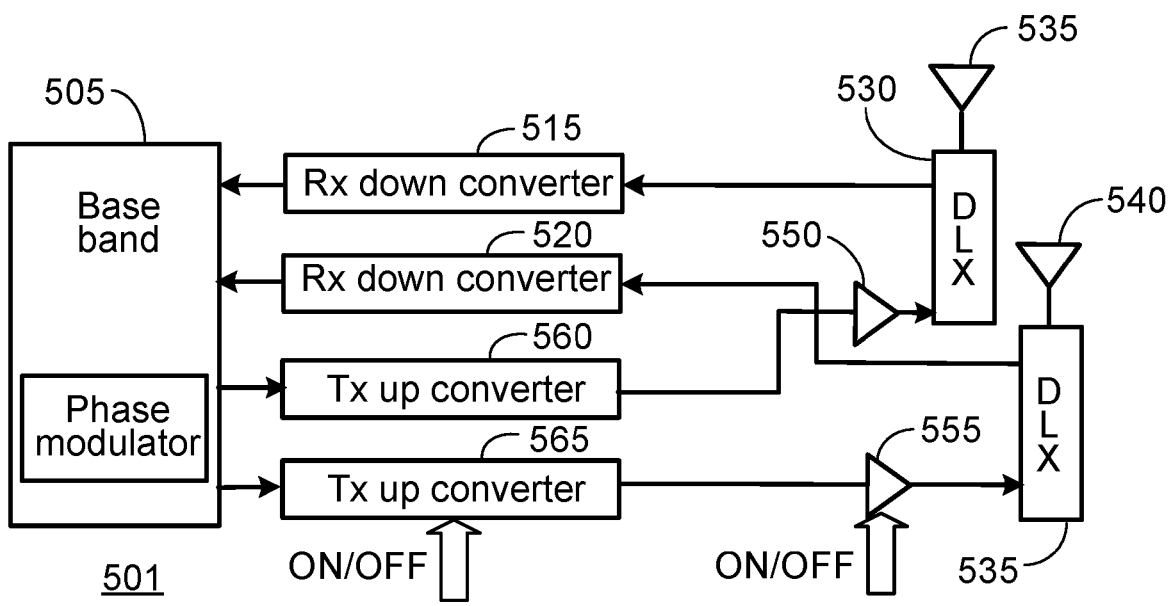

FIG. 3B depicts an alternative implementation of the disclosure (501), in which the phase modulation is not performed by a separate module, but rather, is performed directly by the baseband processor in the baseband frequency prior to up conversion to the RF frequency. In the implementation shown, each of the primary and secondary transmit paths may have its own RF up converter module (560 and 565). It will be recognized that the principles of the disclosure apply to the implementations depicted in FIGS. 3A and 3B, as well as other configurations.

The baseband processor (505) may be connected to receive inputs and produce outputs to control various operations of the transmit paths, as described herein. For example, the controller may provide enabling/disabling signals to any or all of the phase modulator, the primary and secondary power amplifiers, and the RF transmit up converters. In the implementation depicted in FIG. 3A, the baseband processor (505) may be connected and able to disconnect or place on standby the phase modulator (525), and the secondary power amplifier (555). In the implementation depicted in FIG. 3B, the baseband processor (505) may be connected and able to disconnect or place on standby the secondary RF up converter module (565), and the secondary power amplifier (555).

According to an implementation of the disclosure, an offline measurement and calibration procedure may be performed to set threshold values that may be used in online operation of the mobile device. Offline may refer to a UE state during production or when the UE is not actively transmitting a data signal to a base station, such as during a power up cycle.

In one such calibration, using mobile transmit diversity, the mobile device may first perform an offline measurement of diversity operation, for example, mapping a plurality of possible Pout levels against the digital calibration table in the baseband processor. Accordingly, for each such possible Pout level, the current consumption of the entire transmission circuitry (e.g., the two RF up converters, the phase modulator (s), the power amplifiers, and any other active circuitry related to the transmit chain used in the UE) may be measured. Next, with the mobile transmit diversity off (non-diversity operation), the UE may disconnect the diversity transmission components (e.g., the phase modulator, the secondary power amplifier, and the secondary RF up converter) from the power supply, and repeat the measurement of current consumption for various power levels. It will be recognized that the various components involved in diversity or non-diversity transmission may vary from implementation to implementation. For example, in the implementation depicted in FIG. 3B, there may not be a phase modulator whose current consumption is to be measured. Furthermore, it will be recognized that the UE may place various diversity transmission modules or components in standby mode, rather than necessarily disconnecting them from power.

According to some implementations of the disclosure, in operation, the UE may be switched between diversity and non-diversity operation. The switching action may at least in part be based on a condition associated with the level of transmitted power. Accordingly, after offline calibration, the UE may have stored a correlation between power (or current) consumption in diversity or non-diversity operation for each of a variety of transmission power levels. Such a look up table may be used during online operation in order to compare a power (or current) consumption in an operative transmission mode (e.g., diversity) to a threshold based on the stored power consumption in the alternative transmission mode (e.g., non-diversity). It will be recognized that while current consumption is discussed herein as a measure of power, other parameters may be used for measurement and/or comparison. For example, if a voltage may be varied, for example, when using lower voltage to supply power to an amplifier in a fractional power mode, the voltage may likewise be taken into consideration. In some implementations, other parameters, e.g., a TPC signal or sequence, receive power, and/or signal quality indicators, may be used in the power consumption calculations.

According to an implementation of the disclosure, the offline calibration may be performed by using the UE enabled to MTD operation and measuring various power parameters. Measurements may include power and/or current draw and other characteristics of the components or whole transmit paths of the UE. The measurements may be used to map possible levels of the transmit power versus a calibration table. The calibration table may refer to a data reference referred to below used to calculate the threshold level or may refer to a separate data reference. Possible transmit power values may refer to all or a plurality of possible power levels, all or a plurality of possible power levels in the operational range of the UE, or a sample of all or a plurality of possible power levels, which may be sampled at defined increments.

According to one implementation of the disclosure, for each possible transmit power level, the current consumption of the entire transmission circuitry may be measured and recorded or stored in a memory. The entire transmission circuitry may include a phase modulator (if separate), two power amplifiers, and/or other active circuitry of the UE, e.g., one or more transmit RF up converters.

The calibration process may then use an MTD enabled UE operating with the MTD off. The power supply or plurality of supplies may be disconnected from the transmit diversity circuitry or modules, e.g., a phase modulator (if any), the secondary power amplifier, and/or a transmit RF up converter. According to an implementation of the disclosure, the transmit diversity components may be disconnected from the power supply. According to some implementations of the disclosure, power disconnection may refer to a standby mode.

According to some implementations of the disclosure, the calibration process may generate a table or other form of data reference for all possible transmit power levels, which may be stored in a memory of the UP for use during online operation. Such a table may contain a plurality of entries representing current consumption differences between MTD on operation and MTD off operation. According to one implementation of the disclosure, the table may include additional parameters for consideration during online comparisons, e.g., current consumption differences corresponding to a plurality of transmit diversity gains (Gd), 1 dB, 2 dB, or 3 dB.

According to one implementation of the disclosure, a further method may be used calculate a current consumption difference for a given pair of power and Gd values. For each db of gain Gd the maximum possible transmit power of the table may be a defined number of dB lower corresponding to the value of the Gd in dB. This may cause the current drawn to be lower per the same calibration table. The table representing the current consumption difference containing values representing MTD on operation and MTD oil operation may be created by shifting both values for each transmit power level a number of transmit power levels corresponding to the value of Gd in dB, such that the current saving may be increased for every transmit power. For example, if the Gd is 2 dB, the values corresponding to diversity and non-diversity operation in the table may be shifted by 2 places, such that the current saving gain for each transmit power may increase and respectively the current losses at low level transmit power may be reduced.

In order to selectively activate or deactivate diversity transmission, the diversity controller may place the Phase Modulator, Full Power PA and/or the associated TX up converter in active or standby mode, for example, by Changing the value of an enable/disable input pin, depending on whether diversity operation (active) or non-diversity operation (standby) is warranted. As described below, switching may be affected by additional parameters, e.g., capacity considerations such as refraining from switching during increased transmission activity, and mobility detection, e.g., anticipating a trend in transmit power based on motion of the UE towards or away from a base station.

In transit diversity using asymmetric perturbations, a signal is sent more than once, where the content of the signals is the same, but they are transmitted out of phase from one another. This method of transmission can be used for beamforming. In the present disclosure, the receiver, typically a base station, can use the phase difference to determine if the received power was too high or too low. The base station can return an indicator of whether the received power was too high or too low, and the transmitter can use that information to adjust a subsequent signal set. To account for the power level being too high or too low, the transmitter can adjust the phase differentials in the subsequent set of transmitted signals.

Figure 4:
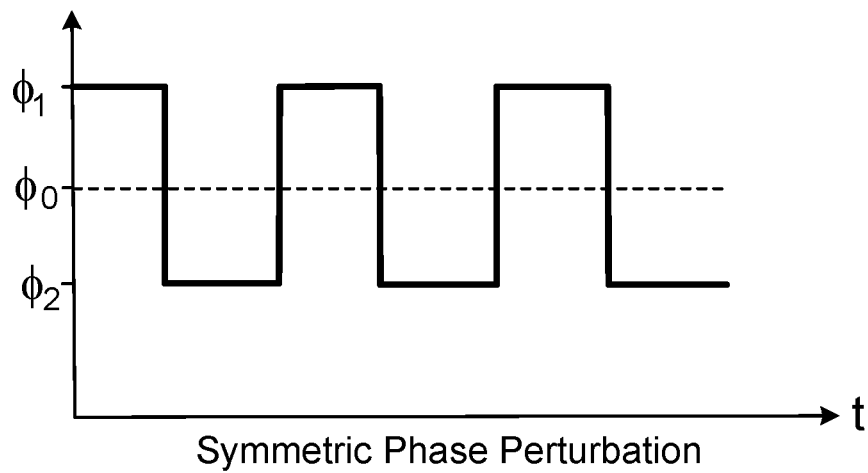
FIG. 4 depicts a chart of an example of delivered phase over time for a two-signal symmetric phase perturbation system, where the signal is delivered from a UE to a base station.
Figure 5:
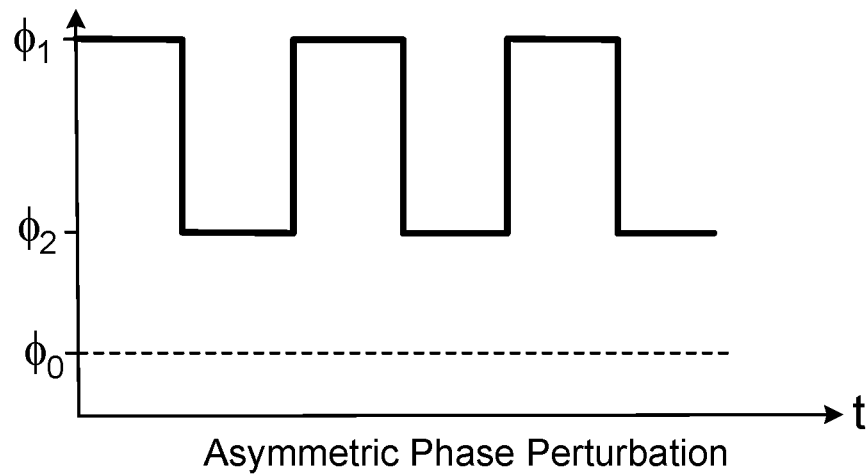
FIG. 5 depicts a chart of an example of delivered phase over time for a two-signal asymmetric phase perturbation system, where the signal is delivered from a UE to a base station.
Figure 6:
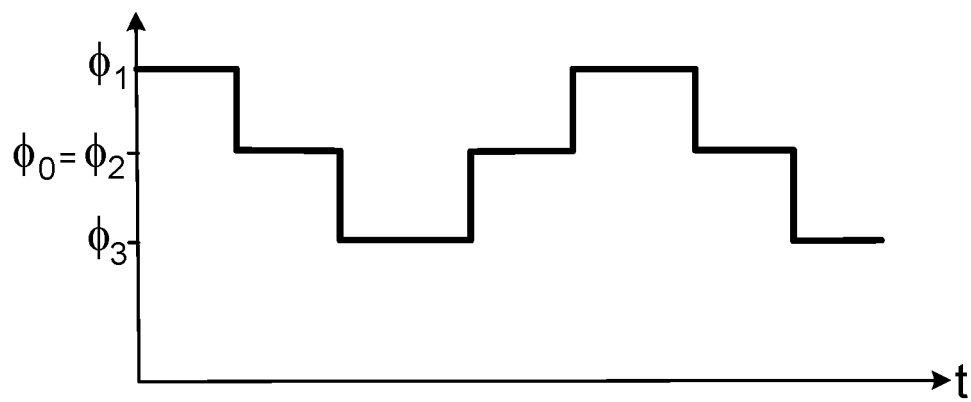
FIG. 6 depicts a chart of an example of delivered phase over time for a three-signal asymmetric phase perturbation system, where the signal is delivered from a UE to a base station.

FIGS. 4-6 show examples of phase perturbation techniques which may be employed. FIG. 4 shows symmetric phase perturbations with regard to transmit diversity in a mobile communication system. The example of FIG. 4 shows a two-signal application. In symmetric phase perturbations, signals are uniformly offset from a reference phase $\varphi_0$. Phases $\varphi_1$ and $\varphi_2$ are equally offset from reference phase $\varphi_0$, where, in the Example of FIG. 4, $\varphi_1$ is offset in a positive direction and 92 is offset in a negative direction.

FIG. 5 depicts an example of a two-signal asymmetric phase perturbation. In this example, phases $\varphi_1$ and $\varphi_2$ are transmitted, but are offset differently from one another relative to reference phase $\varphi_0$. In the example shown, $\varphi_1$-$\varphi_0$ is greater than $\varphi_2$-$\varphi_0$. Although both differences are shown as positive, the differences may not necessarily be of the same sign.

FIG. 6 depicts an example of a three-signal asymmetric phase perturbation. In which phases $\varphi_1$, $\varphi_2$, and $\varphi_3$ are transmitted and, as shown by example, $\varphi_2$=$\varphi_0$, although $\varphi_2$ need not equal $\varphi_0$, and the transmitted phases need not be uniformly distributed (as shown in the figure).

In the present disclosure, in response to the UE transmitting a signal set where the signals differ only in phase, the base station responds with a parameter, which preferably is indicative of the received power. This parameter is generally referred to herein as a TPC, where a TPC is sent from the base station in response to each group of signals. Preferably, the TPC is a single bit, although more bits may also be included in a TPC string.

Figure 7:
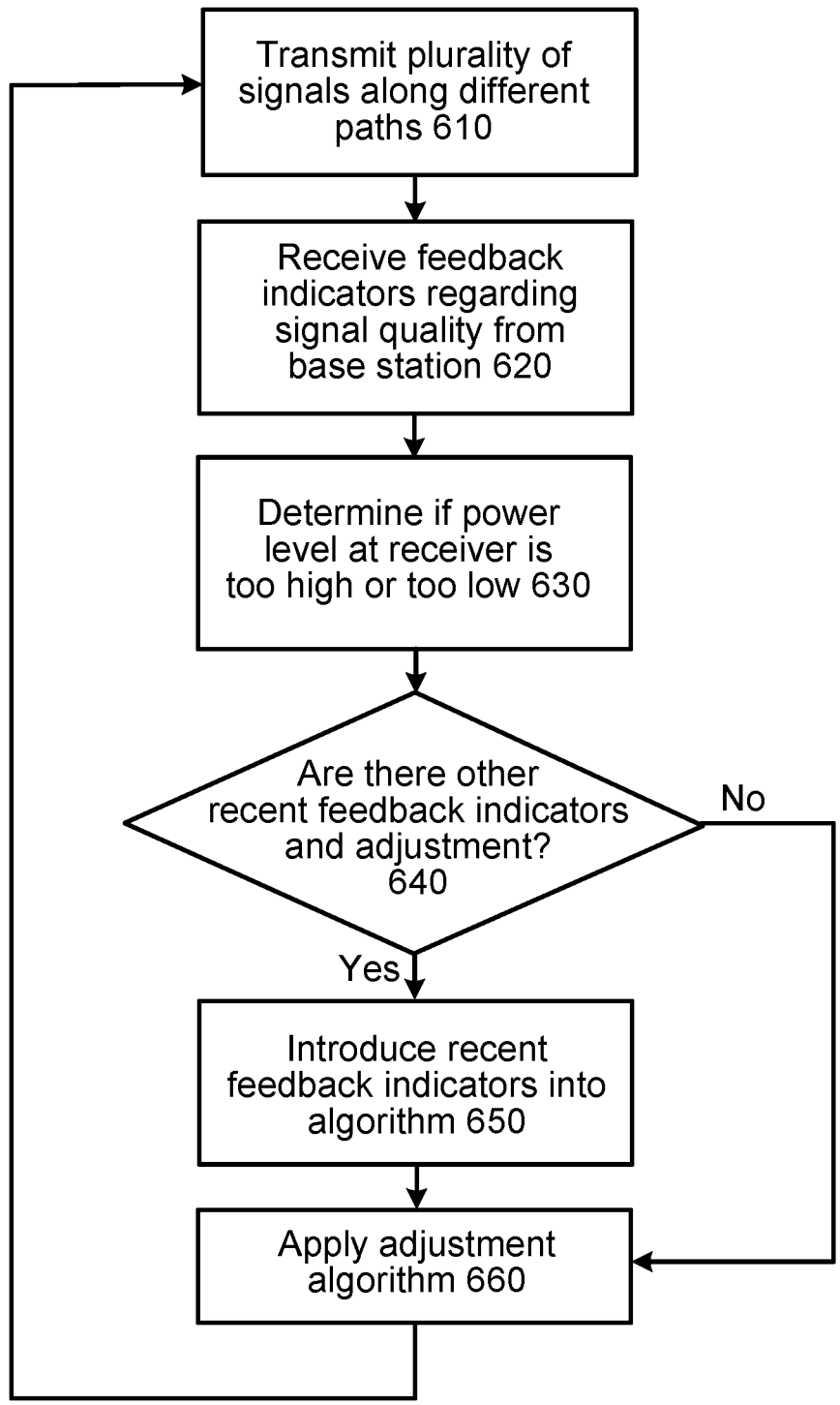
FIG. 7 is a schematic flow chart diagram of a method in accordance with implementations of the present disclosure.

FIG. 7 shows a flow chart of a method of the present disclosure. The UE transmits a plurality of signals along different paths (610). Preferably the UE sends two signals using two antennae, but more may also be sent and the signals may be sent using any number of antennae. The signals are directed to a base station and, following receipt of the signals, for each signal received, the base station returns a signal indicating signal quality of the received signal (620). This signal quality indicator provides adequate information for the UE to understand whether the earlier signals might be adjusted in some way so as to improve efficiency or performance. Based on the indicators received, the UE determines if the most recently transmitted signals are at too high or too low a power level (630). The UE then determines if these recently transmitted signals are the only signals in which it received feedback indicators (640). If they are the only signals, an algorithm adjusting one or more transmit parameters, where the algorithm is based on the feedback indicators and previous transmit parameters is applied (660), If there are other signals relative to which feedback indicators had been received, the algorithm is changed to introduce aspects of those transmit signals and feedback indicators (650). The revised algorithm is then applied (660). The transmit parameters resulting from the algorithm are then used to transmit a new set of signals along different paths (610) and the process is repeated.

Figure 8:
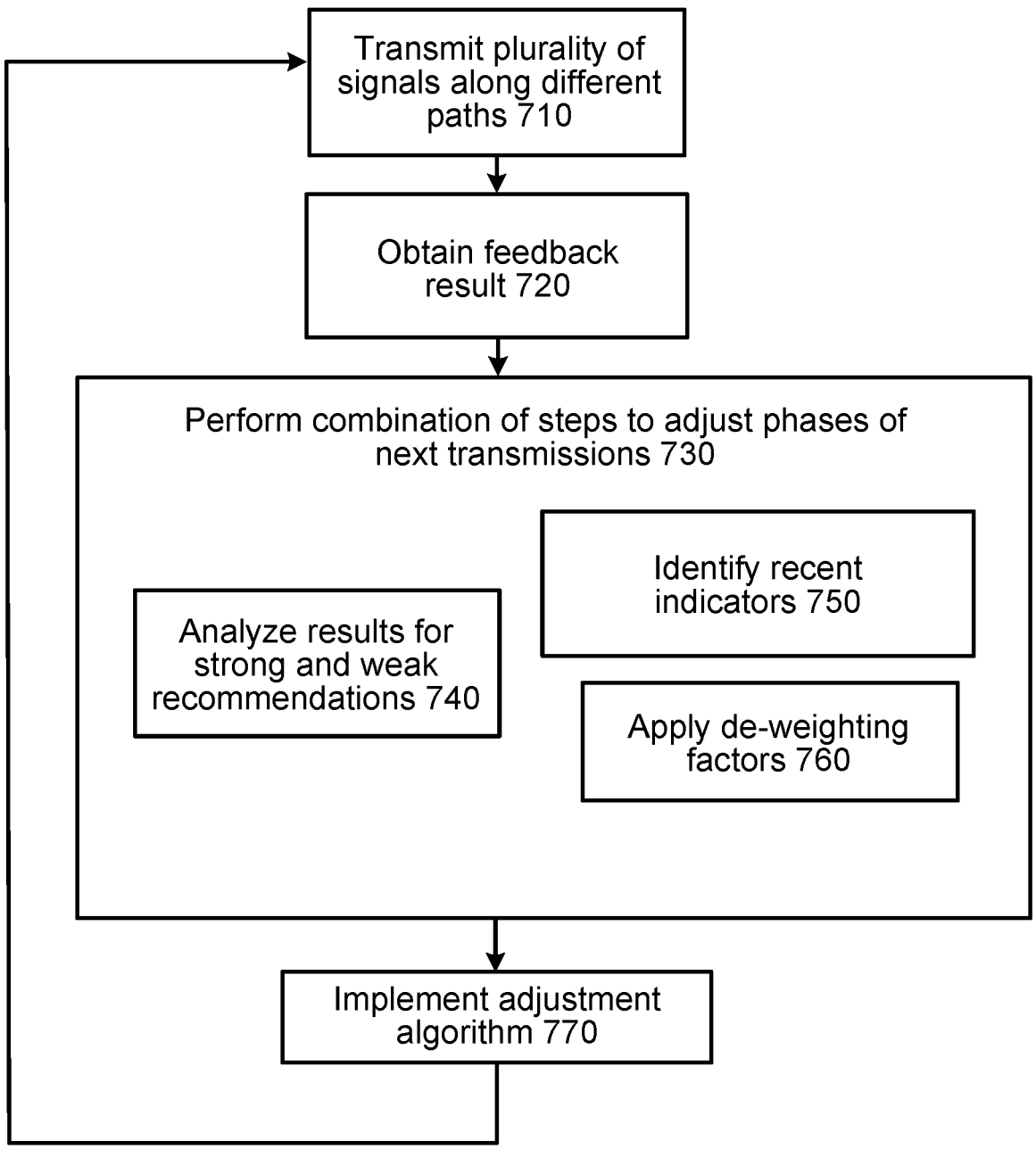
FIG. 8 is a schematic flow Chart diagram of a method in accordance with an implementation of the present disclosure.

FIG. 8 shows a flow chart of a variation of the method shown in FIG. 7. The UE transmits a plurality of signals along different paths (710). Feedback results are then obtained (720). Then the UE performs a combination of steps to adjust the phases of the next transmissions (730), where the UE may perform any or all of the steps of analyzing results for strong and weak recommendations (740), determining recent feedback indicators, adjustments, and results (750), and applying one or more de-weighting factors (760). The result is to enter results into an algorithm (770) and then repeating the process by transmitting a plurality of signals along different paths (710). The strong and weak indicators may be based on a combination of recent input parameters. For example, the majority of parameters may be used to adjust phase differences in a particular way, the strength of the majority may be used to further adjust the phase differences, the weakness of a majority may result in limited changes, or the lack of a majority may result in other changes. Certainly, other types of analysis may be performed on the input parameters so as to result in changes in phase. As another example, a pre-selected quantity of input parameters may be used, only selected input parameters may be used, or recent results may be used as further input to phase changes. In summary, an algorithm may be implemented as a function so as to determine changes to phase differences.

Mobile transmit diversity (MTD), also known as uplink transmit diversity (ULTD), allows mobile devices in a cellular telecommunications system to save transmit power, extend cell range, and attain other benefits, by transmitting a diversity signal on two or more antennas simultaneously. The signals differ by a diversity parameter, typically, a phase difference. Feedback from the base station in communication with the mobile device allows the mobile device to adjust a diversity parameter, thereby allowing beamforming by the mobile device to increase perceived receive power of the combined signal at the base station. The feedback may be any signal from the base station, for example, a quality indication signal, e.g., transmit power control signal instructing the mobile device to increase transmit power (POWER-UP, also referred to as logical 0, or arithmetic −1), or decrease transmit power (POWER-DOWN, also referred to as logical 1, or arithmetic +1). There is a need for a method of establishing by the mobile station whether and if so, how, to modify the transmit diversity parameter based on feedback parameters.

Illustration 1

In the resulting sequence of TPC signals, if all the TPC signals indicated an improvement in received signal quality, e.g., a 11 sequence of two TPC signals, or a 111 sequence of three TPC signals, etc., then the set point $\varphi_0$ may be modified in the direction of $\varphi_1$ to a new initial phase difference, $\varphi_0'$. In some implementations, for example, $\varphi_0'$ may be set to $\varphi_0'=\varphi_0+(\varphi_1-\varphi_0)$. In some implementations, for example, $\varphi_3'$ may be set to be incremented by a fraction, e.g., half, or one third, or a quarter, of $(\varphi_1-\varphi_0)$.

Similarly, in the resulting sequence of TPC signals, if all the TPC signals indicated a degradation in received signal quality, e.g., a 00 sequence of two TPC signals, or a 000 sequence of three TPC signals, then the set point $\varphi_0$ may be modified in the opposite direction of $\varphi_1$ to a new initial phase difference, $\varphi_0'$. In some implementations, for example, $\varphi_3'$ may be set to $\varphi_0'=\varphi_0-(\varphi_1-\varphi_0)$. In some implementations, for example, $\varphi_0'$ may be set to be decremented by a fraction, e.g., half, or one third, or a quarter, of $(\varphi_1-\varphi_0)$.

In this illustration of an implementation of the disclosure, all non-uniform responses may be considered inconclusive. Thus, for example, a 01 or 10 sequence of two TPC signals, or a 001, 010, 011, 100, 101, or 110 sequence of three TPC signals, may be considered inconclusive, in which case, the mobile device may maintain the phase difference at $\varphi_0$, until the next perturbation.

Illustration 2

In the resulting sequence of TPC signals, if all or a majority of the TPC signals indicated an improvement in received signal quality, e.g., a 110 sequence of three TPC signals, then the set point $\varphi_0$ may be modified in the direction of $\varphi_1$ to a new initial phase difference, $\varphi_0'$, as discussed above.

Similarly, in the resulting sequence of TPC signals, if all or the majority of the TPC signals indicated a degradation in received signal quality, e.g., a 001 sequence of three TPC signals, then the set point $\varphi_0$ may be modified in the opposite direction of $\varphi_1$ to a new initial phase difference, $\varphi_0'$, as discussed above.

If the resulting sequence of TPC signals is inconclusive, e.g., 01 or 10 in a sequence of two TPC signals, then the mobile device may maintain the phase difference at $\varphi_0$.

In some implementations, a distinction may be made between majorities, resulting in a strong recommendation or a weak recommendation. Thus, for example, or 110 may be a majority resulting in a strong recommendation to increment $\varphi_0$ in the direction of $\varphi_1$, because the first two responses (i.e., to phase differences ($\varphi_1$ and $\varphi_2$, but not $\varphi_3$) resulted in a favorable POWER-DOWN. Likewise, for example, or 001 may be a majority resulting in a strong recommendation to modify $\varphi_0$ in the direction opposite to $\varphi_1$, because the first two responses (i.e., to phase differences ($\varphi_1$ and $\varphi_2$, but not $\varphi_3$) resulted in an unfavorable POWER-UP. However, other majorities, e.g., 010 and 101, or possibly also 011 and 110 sequences of three TPC signals, may be considered a weak recommendation, because they fail to show a trend, and therefore, may be considered inconclusive.

Illustration 3

In some implementations of the disclosure, when a TPC sequence is inconclusive (or almost conclusive), additional logic may be applied. According to some implementations of the disclosure, such additional logic may be a "de-weighting" process since the earlier power control information (TPC) have been used to decrease or increase the transmit power for the later power control decision at the base station, and hence affect the later TPC. To bear out this "memory" effect, de-weighting factors, e.g., a, b, c . . . , may be used to de-weight TPC values. The de-weighted TPC values may be summed (e.g., a×TPC1+b×TPC2+c×TPC3+ . . . ) to determine the direction and value of the next move of the base phase difference $\varphi_0$. For example, the arithmetic values of the TPC may be used, and a, b, c . . . can be positive or negative integers or fractional numbers.

Illustration 4

In some implementations of the disclosure, different majorities may be associated with different modifications to $\varphi_0$. For example, in the case of a strong recommendation, $\varphi_0$ may be modified by $(\varphi_1-\varphi_0)$, while in the case of a weak recommendation, $\varphi_0$ may be modified by a fraction of $(\varphi_1-\varphi_0)$. For example, the fraction may be half, quarter, or any suitable fraction of $(\varphi_1-\varphi_0)$.

In some implementations of the disclosure, the strength of a majority may correspond to the amount of change in $\varphi_0$. Thus, for example, a weak recommendation of two POWER-DOWN signals out of a TPC sequence of three signals may result in modifying $\varphi_0$ by a small increment in the direction of $\varphi_1$, e.g., $\varphi_0'=\varphi_0+(\varphi_1-\varphi_0)/2$, while a strong recommendation of 111 out of a TPC sequence of three signals may result in modifying $\varphi_0$ by a larger increment in the direction of $\varphi_1$, e.g., $\varphi_0'=\varphi_0+(\varphi_1-\varphi_0)$. Likewise, for example, a weak recommendation of two POWER-UP signals out of a TPC sequence of three signals may result in modifying $\varphi_0$ by a small increment in the opposite direction of $\varphi_1$, e.g., $\varphi_0'=\varphi_0-(\varphi_1-\varphi_0)/2$, while a strong recommendation of 000 out of a TPC sequence of three signals may result in modifying $\varphi_0$ by a larger increment in the opposite direction of e.g., $\varphi_1$, e.g., $\varphi_0'=\varphi_0-(\varphi_1-\varphi_0)$.

In some implementations, there may be different fractional increments associated with different majorities. For example, a weak indication of favorable change of 100 (i.e., POWER-DOWN for $\varphi_1$, but POWER-UP for $\varphi_2$ and $\varphi_3$) may recommend a small increment; a medium indication of favorable change of 110 (i.e., POWER-DOWN for $\varphi_1$ and $\varphi_2$, but POWER-UP for $\varphi_3$) may recommend a medium increment; and a strong indication of favorable change of 111 (i.e., POWER-DOWN for all of $\varphi_1$, $\varphi_2$ and $\varphi_3$) may recommend a large increment. The same holds true for indications of unfavorable change, and modifications of the nominal value in the opposite direction. Any small, medium, and large increments may be used, e.g., ¼, ½, and ¼ of $(\varphi_1-\varphi_0)$, etc.

While certain features of the disclosure have been illustrated and described herein, many modifications, substitutions' changes, and equivalents will now occur to those of ordinary skill in the art. It is, therefore, to be understood that the appended claims are intended to cover all such modifications and changes as fall within the true spirit of the disclosure.

The examples described, and hence the scope of the claims below, may encompass examples in hardware, software, firmware, or a combination thereof. It will also be appreciated that the processes, in the form of instructions having a sequence, syntax, and content, of the present disclosure may be stored on (or equivalently, in) any of a wide variety of tangible computer-readable media such as magnetic media, optical media, magneto-optical media, electronic media (e.g., solid state ROM or RAM), etc. the form of which media not limiting the scope of the present disclosure.

The thresholds and other attributes of the examples provided above are not absolutes, but rather merely examples that illustrate one or more of a variety of possibilities. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described examples may be made without departing from the spirit and scope of the disclosure defined by the claims thereto.

What is claimed is:

1. A method for delivering a wireless transmission signal set by a mobile device, the method comprising:
   in a diversity mode of operation:
      transmitting a plurality of signal sets directed to a base station, each signal set comprising the same number of signals, all signals in a set differing only in phase;
      receiving a plurality of input parameters, each input parameter corresponding to a transmitted signal set;
      deriving a received signal quality measure for said transmitted signal sets as a function of said plurality of received input parameters; and
      delivering an improved signal set, the improved signal set having a level of transmitted power, and where phase differences of signals in the improved signal set are determined as a function of the received signal quality measure; and
   responsive to determining that a condition associated with the level of transmitted power is met, switching to a non-diversity mode of operation,
   wherein determining that a condition associated with the level of transmitted power is met comprises comparing a power consumption in the diversity mode of operation to a threshold, wherein the threshold is based on a stored value of power consumption in the non-diversity mode of operation.

2. The method of claim 1, wherein each input parameter represents a parameter selected from the group consisting of relative phase, relative amplitude, absolute power, frequency of modification, a transmit power control parameter, a representation of a recommendation for improved power levels, and timing of application of a transmitted signal set.

3. The method of claim 1, wherein the received signal quality measure represents a measure of a received power level.

4. The method of claim 1, wherein deriving the received signal quality measure includes deriving the received signal quality measure for said transmitted signal sets using the most recently received input parameters and without using input parameters received before the most recently received input parameters.

5. The method of claim 1, wherein deriving the received signal quality measure includes applying de-weighting factors to the input parameters.

6. The method of claim 5, wherein said de-weighting factors weigh input parameters more heavily based on when each is received.

7. The method of claim 1, wherein deriving the received signal quality measure includes identifying a majority value among the input parameters and accounts for non-uniform values among the input parameters by making adjustment in said improved signal set based on the majority value.

8. The method of claim 1, wherein the diversity mode of operation comprises using first and second power amplifiers, and wherein the non-diversity mode of operation comprises using the first power amplifier.

9. The method of claim 8, wherein the first power amplifier is a high power amplifier and the second power amplifier is a low power amplifier.

10. The method of claim 8, wherein the first power amplifier is rated to transmit a full power allocated to the mobile device and the second power amplifier is rated to transmit a fraction of the full power allocated to the mobile device.

11. The method of claim 1, wherein the input parameters are open-loop feedback parameters.

12. The method of claim 1, wherein the input parameters are transmit power control feedback signals.

13. The method of claim 1, wherein determining the phase differences includes:
   determining a base phase difference based on a summation of the input parameters each weighted by corresponding weights;
   selecting a weight, from among multiple weights, based on the received signal quality measure; and
   determining an adjusted phase difference by applying the selected weight to the base phase difference, wherein the adjusted phase difference is one of the phase differences of the signals in the improved signal set.

14. The method of claim 1, comprising using a look up table to compare a power or current consumption in a currently operative transmission mode with a threshold based on stored power consumption in a different transmission mode.

15. A mobile subscriber unit apparatus adapted to deliver a wireless transmission signal set comprising:
   a transmitter to transmit signal sets directed to a base station,
   a receiver to receive an input parameter in response to a transmitted signal set,
   a processor to derive a calculated received signal quality measure, and
   a signal generator to generate a plurality of signals for transmission;
   wherein the apparatus is configured such that, in a diversity mode of operation, said transmitter transmits a plurality of signal sets directed to a base station, in response said receiver receives one input parameter per transmitted signal set, said processor calculates a received signal quality measure as a function of a plurality of received input parameters, and said signal generator generates an improved signal set for transmission to said base station, the improved signal set having a level of transmitted power;
   wherein the apparatus is configured to switch to a non-diversity mode of operation in response to determining that a condition associated with the level of transmitted power is met, wherein determining that a condition associated with the level of transmitted power is met comprises comparing a power consumption in the diversity mode of operation to a threshold, wherein the threshold is based on a stored value of power consumption in the non-diversity mode of operation;
   wherein each signal set comprising the same number of signals and all signals in a set differing only in phase; and
   wherein phase differences of the signals in the improved signal set are determined as a function of the received signal quality measure.

16. The apparatus of claim 15, wherein said input parameter represents a parameter selected from the group consisting of relative phase, relative amplitude, relative power, absolute power, frequency of modification, a transmit power control parameter, a representation of a recommendation for improved power levels, and timing of application of a transmitted signal set.

17. The apparatus of claim 15, wherein the received signal quality measure represents a measure of a received power level.

18. The apparatus of claim 15, wherein the apparatus is configured to calculate the received signal quality measure as a function of only the most recently received input parameters.

19. The apparatus of claim 15, wherein the apparatus is configured to calculate the received signal quality measure by performing operations including applying de-weighting factors to the input parameters.

20. The apparatus of claim 15, wherein the apparatus is configured to calculate the received signal quality measure by performing operations including identifying a majority value among the input parameters and accounts for non-uniform values among the input parameters by making adjustment in said improved signal set based on the majority value.

* * * * *